(12) United States Patent
Yeh et al.

(10) Patent No.: US 6,445,575 B1
(45) Date of Patent: Sep. 3, 2002

(54) BASE CAPABLE OF ADJUSTING THE ELEVATION OF A PANEL

(75) Inventors: Chih-Feng Yeh; Bo-Tseng Lee, both of Taipei (TW)

(73) Assignee: Acer Inc. (TW)

(*) Notice: Subject to any disclaimer, the term of this patent is extended or adjusted under 35 U.S.C. 154(b) by 51 days.

(21) Appl. No.: 09/791,066

(22) Filed: Feb. 22, 2001

(30) Foreign Application Priority Data

Sep. 11, 2000 (TW) .................................... 089118771 A

(51) Int. Cl.$^7$ ............................ H05K 5/02; G06F 1/16; F16M 13/00
(52) U.S. Cl. .................... 361/681; 361/683; 312/223.1; 345/827; 248/161; 248/917
(58) Field of Search .............................. 361/683, 679, 361/681, 682, 801, 802; 312/223.1; D14/126, 113; 345/825, 827; 248/161, 917–924

(56) References Cited

U.S. PATENT DOCUMENTS

| | | | | |
|---|---|---|---|---|
| 4,438,458 A | * | 3/1984 | Munscher | 248/184.1 |
| 4,690,362 A | * | 9/1987 | Helgeland | 248/183.1 |
| 4,691,886 A | * | 9/1987 | Wendling et al. | 248/123.11 |
| 5,100,098 A | * | 3/1992 | Hawkins | 16/339 |
| 5,715,137 A | * | 2/1998 | Choi | 361/681 |
| 5,854,735 A | * | 12/1998 | Cheng | 16/340 |
| 5,924,665 A | * | 7/1999 | Sweere et al. | 248/278.1 |
| D418,831 S | * | 1/2000 | Rosen et al. | D14/126 |
| 6,108,200 A | * | 8/2000 | Fullerton | 235/145 R |
| 6,266,236 B1 | * | 7/2001 | Ku et al. | 312/223.1 |
| 6,268,997 B1 | * | 7/2001 | Hong | 248/398 |

* cited by examiner

*Primary Examiner*—Jayprakash N. Gandhi
(74) *Attorney, Agent, or Firm*—Knobbe, Martens, Olson & Bear, LLP

(57) ABSTRACT

A base enables the elevation of a panel to be selectively adjusted. The base includes a fixed flap, a supporting flap assembly and a hinge. The fixed flap is attached to the backside of the panel. The supporting flap assembly supports the panel. The hinge connects the fixed flap and the supporting flap assembly. The supporting flap assembly includes a top flap and a fan-wheel. The top flap has a protrusion on a surface thereof, and the fan-wheel has a plurality of recesses that are positioned to selectively engage the protrusion. The fan-wheel is connected to the top flap by a pivot that enables the fan-wheel to turn with respect to the top flap. The hinge enables the fixed flap and the supporting flap assembly to turn around the shaft of the hinge to position the supporting flap assembly with respect to the fixed flap. The elevation of the base can be adjusted by changing the extent to which the fan-wheel is turned with respect to the top flap.

20 Claims, 13 Drawing Sheets

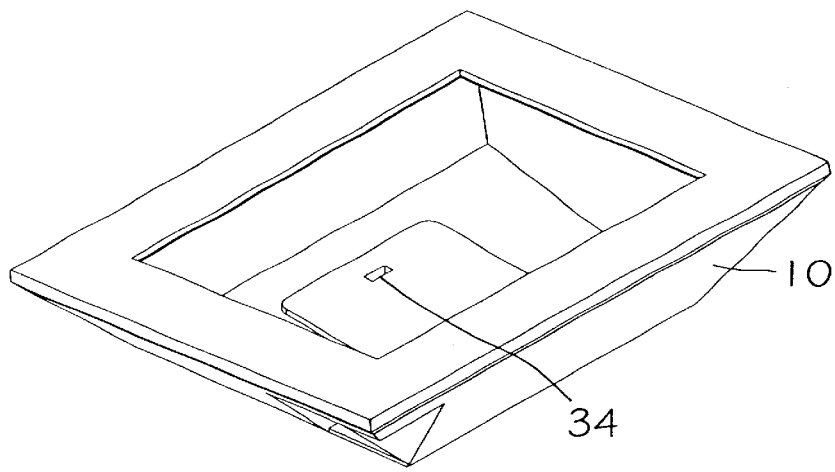
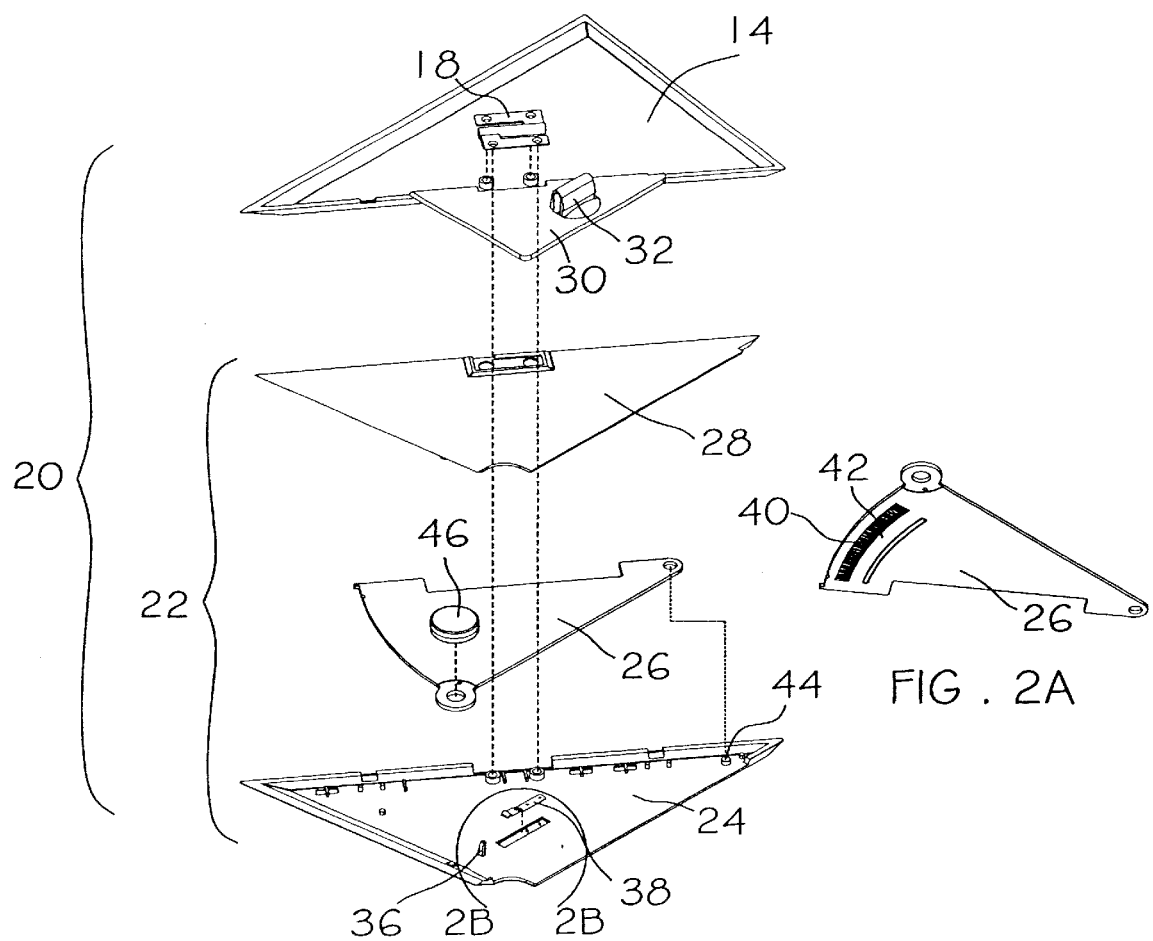
FIG. 2A
FIG. 2

BASE CAPABLE OF ADJUSTING THE ELEVATION OF A PANEL

RELATED APPLICATION

This application claims the benefit of priority under 35 U.S.C. § 119(a) of Taiwan Patent Application No. 089118771, titled "Base Capable of Adjusting the Elevation of a Panel," filed on Sep. 11, 2000.

BACKGROUND OF THE INVENTION

1. Field of the Invention

This invention relates to a base, and more particularly to a base capable of adjusting the elevation of a display panel.

2. Description of the Related Art

FIG. 1 illustrates a schematic diagram of a prior art base 12 used for supporting a panel 10. As shown in FIG. 1, the prior art base 12 is located on the backside of the panel 10 for supporting the panel 10 and allowing the panel 10 to stand on any platform. The base 12 comprises a fixed flap 14, a supporting flap 16, and a hinge 18. The fixed flap 14 is attached to the backside of the panel 10, and the hinge 18 connects the fixed flap 14 and the supporting flap 16. Both the fixed flap 14 and the supporting flap 16 can turn about a shaft of the hinge 18 such that the panel 10 can stand on any platform and be positioned at a specific elevation.

As shown in FIG. 1, the prior art base 12 provides the panel 10 with only a single, fixed elevation such that the users can only view the panel 10 at a fixed viewing angle. However, different users view the panel 10 at different elevation levels. Thus, the prior art base design fails to provide users with the comfort they desire when they view the panels. This problem is exacerbated for those who need to view the panel for an extended period of time, which may result in severe fatigue of the eyes and the muscles.

SUMMARY OF THE INVENTION

This invention provides a base capable of adjusting the elevation of a panel to allow a user to flexibly adjust the elevation of a panel when the user views the panel to provide the user with greater comfort. In addition to allowing the user to adjust the elevation of a panel, the base can be freely mounted on or disassembled from the panel such that the user has more use options with the base design.

The foregoing is a brief description of some of the deficiencies in the prior art and the advantages of this invention. Other features, advantages, and embodiments of the invention will be apparent to those skilled in the art from the following description, the accompanying drawings and appended claims.

BRIEF DESCRIPTION OF THE INVENTION

The present invention will be described below in connection with the accompanying drawing figures in which:

FIG. 2 illustrates a schematic diagram of an exploded view of a first embodiment of the present invention;

FIG. 2A illustrates a reverse diagram of the fan-wheel shown in FIG. 2;

FIGS. 3A and 3B illustrate operational diagrams of the fan-wheel of the first embodiment of the present invention, wherein FIG. 3A illustrates the fan-wheel in an unextracted position with respect to the supporting flap assembly, and wherein FIG. 3B illustrates the fan-wheel in an extracted position with respect to the supporting flap assembly;

DETAILED DESCRIPTION OF THE PREFERRED EMBODIMENT

Figure 1:
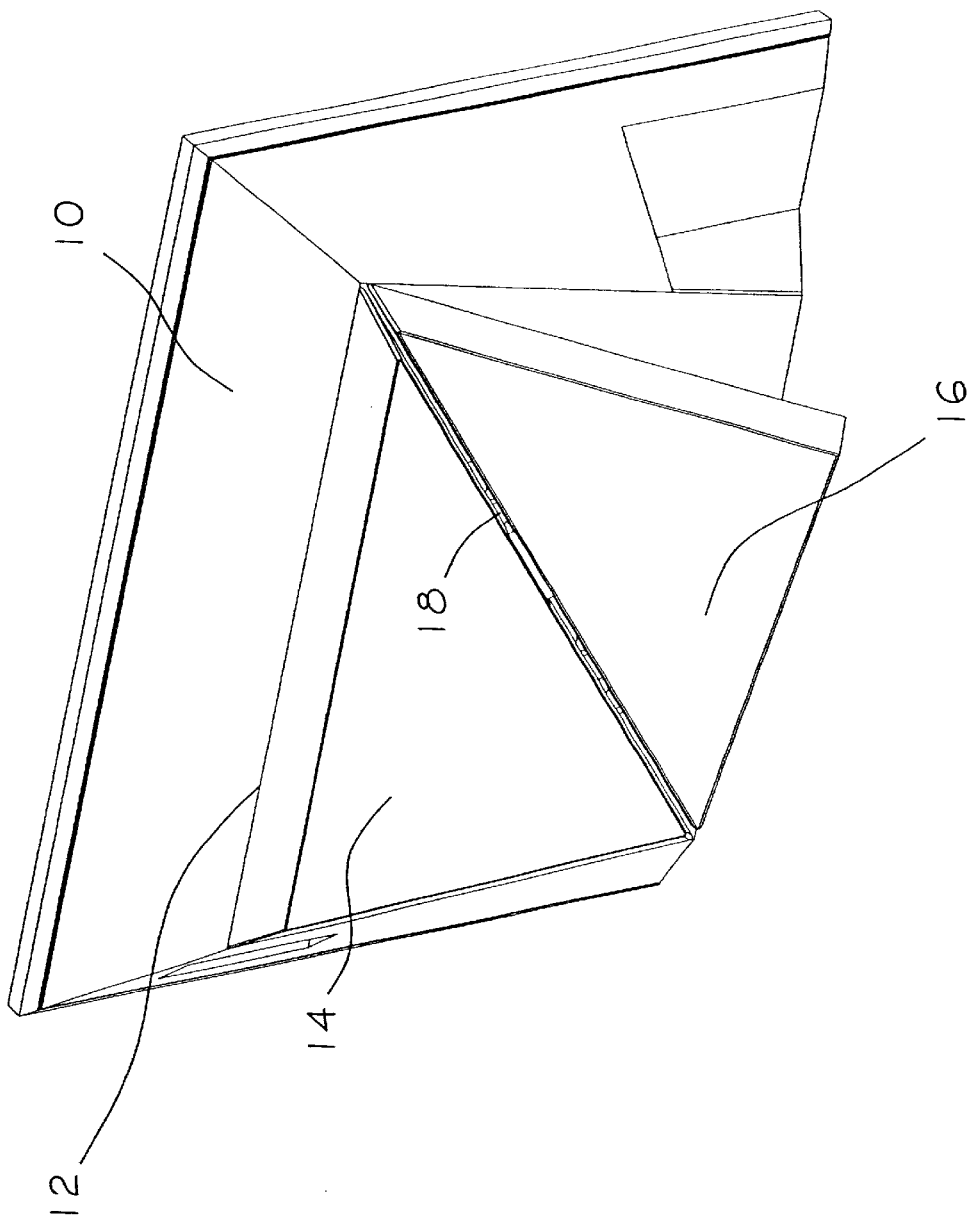
FIG. 1 illustrates a schematic diagram of a prior art base used for supporting a panel.

As described above, the prior art base in FIG. 1 has only a single, fixed elevation for the panel 10, which forces a user to view the panel 10 at a fixed viewing angle. To provide greater comfort to the user when viewing the panel and to alleviate severe fatigue of the eyes and the muscles to a user who needs to view the panel for a long time, the present invention provides a base capable of adjusting the elevation of the panel.

Figure 2B:
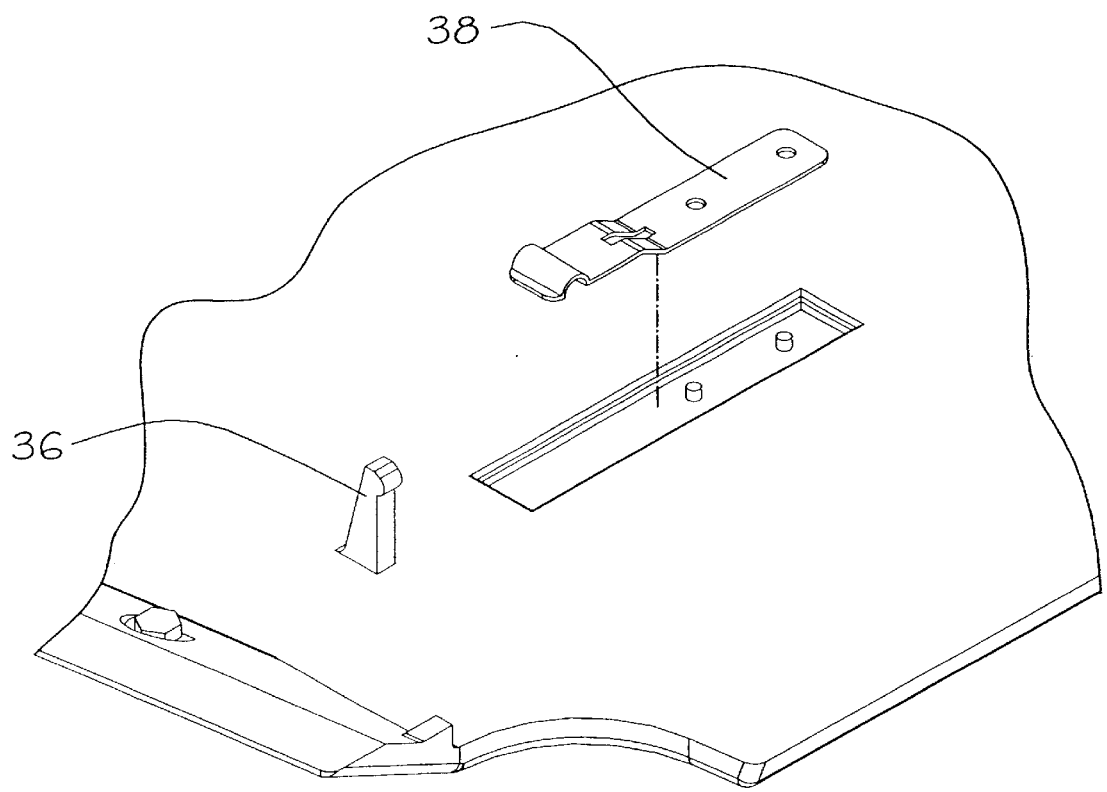
FIG. 2B illustrates an enlarged portion of the top flap shown in FIG. 2 to show more detail of the boss and the elastic element on the top flap.

FIG. 2 illustrates a schematic diagram of a first embodiment of the present invention, which comprises a base 20 that attaches to the back of the display panel 10. As shown in FIG. 2, the base 20 comprises a fixed flap 14, a supporting flap assembly 22, and a hinge 18. The supporting flap assembly 22 comprises a top flap 24, a fan-wheel 26 and a bottom flap 28. A balk (i.e., check or stop) flap 30 extends from one lateral side of the fixed flap 14 to prevent the supporting flap assembly 22 from turning excessively. A wedged latch 32 on the balk flap 30 mates with a cavity 34 in the panel 10 so that the fixed flap 14 can be attached to the backside of the panel 10. In addition, a user can freely mount the base 20 to the panel 10 or disassemble the base 20 from the panel 10 with the wedged latch 32, thus providing a user with more options for using the base design. As shown in more detail in FIG. 2B, a boss 36 and an elastic (i.e., resilient or springy) element 38 are included on one surface of the top flap 24.

FIG. 2A illustrates the reverse side of the fan-wheel 26 in FIG. 2. As shown in FIG. 2A, the surface of the reverse side of the fan-wheel 26 that faces the top flap 24 includes a plurality of recesses 40 and an arcuate groove 42 (shown in more detail in FIG. 3C). The recesses 40 engage the boss 36 on the top flap 24. The arcuate groove 42 accommodates the elastic element 38 on the top flap 24. The fan-wheel 26 connects with the top flap 24 by a pivot 44 such that the fan-wheel 26 can turn with respect to the top flap 24. Furthermore, the fan-wheel 26 also comprises a tab 46 to allow a user to control the extraction and the thrust of the fan-wheel 26 more easily. The tab 46 also acts as a supporting point of the panel 10 to prevent the panel 10 from sliding. The bottom flap 28 covers the fan-wheel 26 and is welded to the top flap 24 by sonication (i.e., ultrasonic welding). The hinge 18 connects the fixed flap 14 and the supporting flap assembly 22 and allows both the fixed flap 14 and the supporting flap assembly 22 to each turn about a shaft of the hinge 18 so that the positions of the flaps can be adjusted with respect to each other.

Figure 3A:
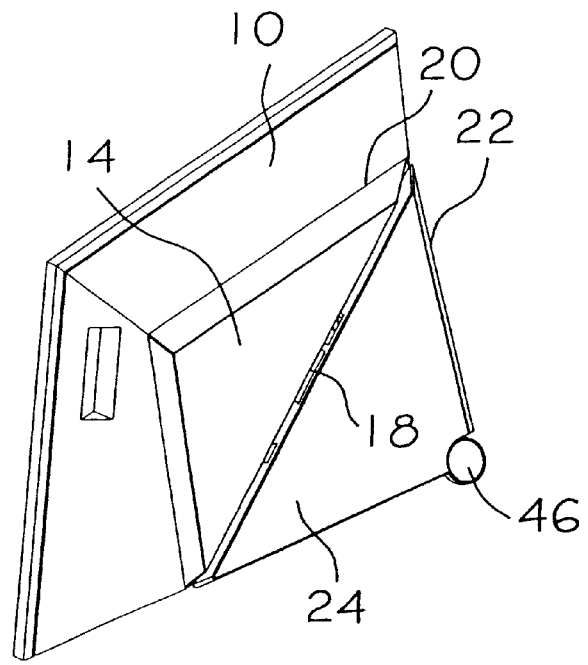
Figure 3B:
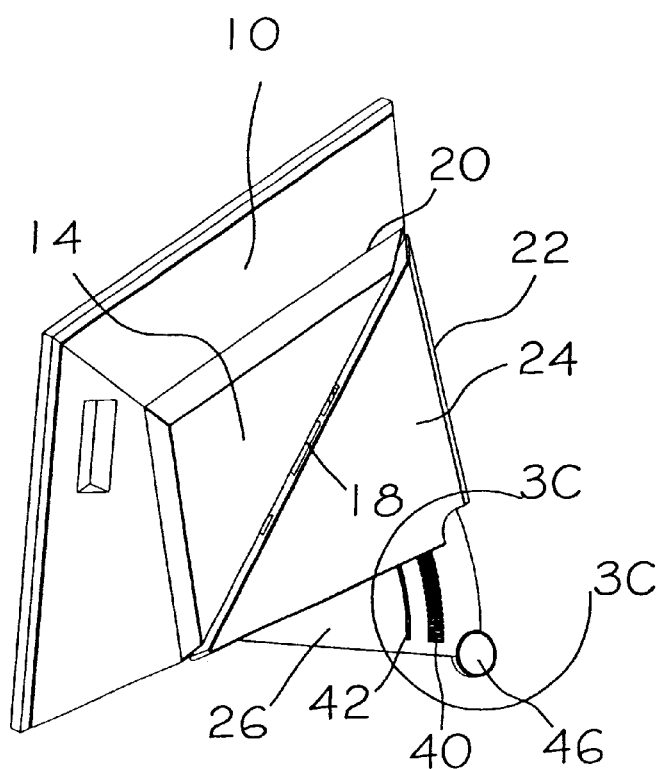
Figure 3C:
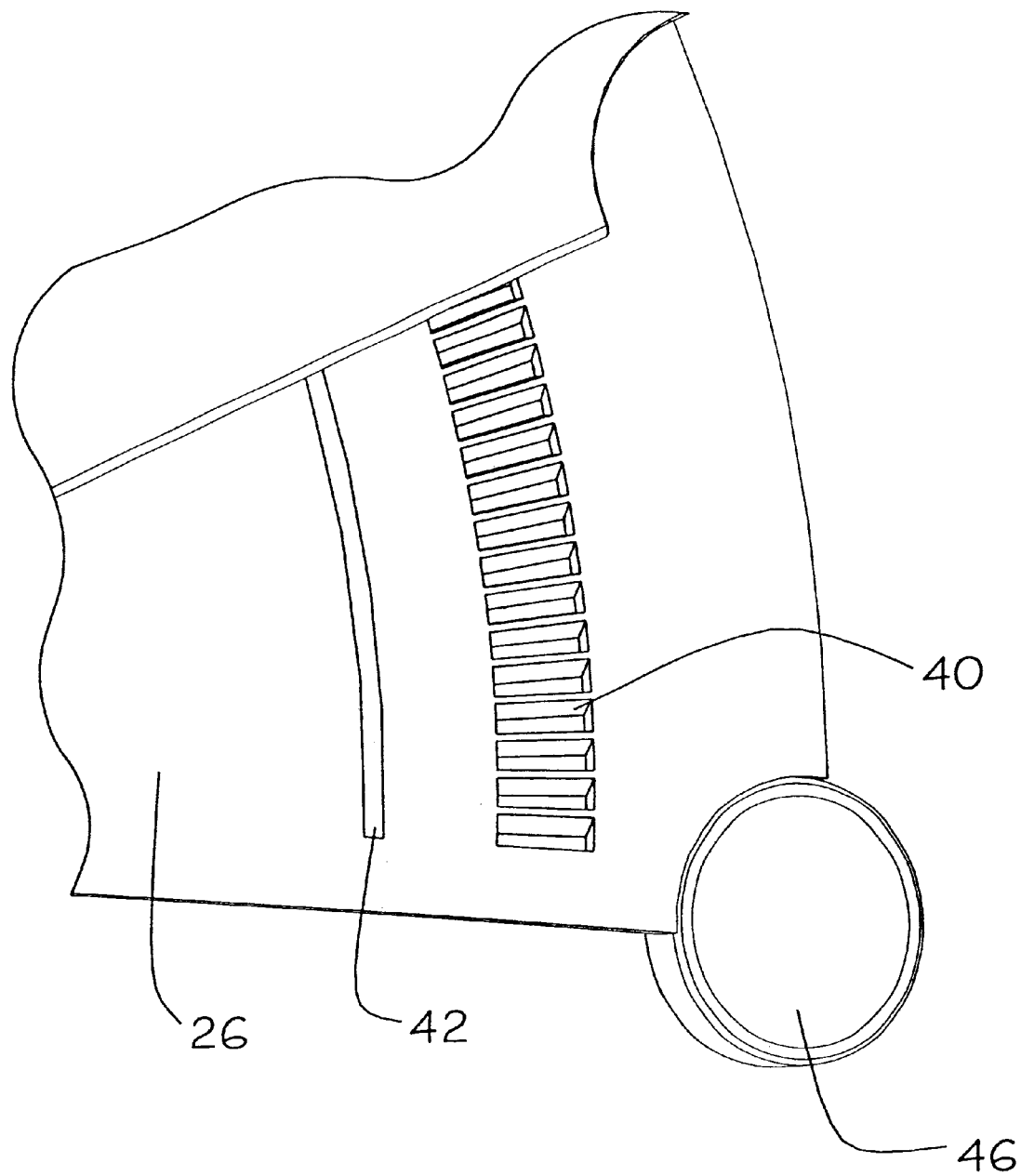
FIG. 3C illustrates an enlarged portion of the fan-wheel in FIG. 3B to show more detail of the recesses and the groove on the fan-wheel.

FIGS. 3A and 3B illustrate operational diagrams of the fan-wheel 26 of the first embodiment of this invention. FIG. 3A illustrates the fan-wheel 26 in an unextracted position with respect to the supporting flap assembly 22. As shown in FIG. 3A, when the fan-wheel 26 is not extracted from the supporting flap assembly 22, the base 20 uses the supporting flap assembly 22 to support the panel 10. With the support of the supporting flap assembly 22, the panel 10 can stand on a platform and be positioned at a specific elevation. This configuration is similar to the configuration shown in FIG. 1 because it has only a single, fixed elevation for the panel 10. A user can only view the panel 10 at a fixed viewing angle in this configuration.

FIG. 3B illustrates the fan-wheel in an extracted position with respect to the supporting flap assembly 22. When the user extracts the fan-wheel 26 from the supporting flap assembly 22 with the tab 46, the user can control the extent of the extraction of the fan-wheel 26 from the supporting flap assembly 22. The user can also adjust the elevation of the panel 10 by engaging the boss 36 of the top flap 24 with a selected one of the recesses 40 (see FIG. 3C) of the fan-wheel 26. When the panel 10 is set on a platform, the weight of the panel 10 makes the boss 36 remain engaged with the selected recess 40. Therefore, through the friction force between the tab 46 and the platform, the panel 10 can stand on the platform without sliding. When the fan-wheel 26 is to be retracted back into the supporting flap assembly 22, the user pushes against the back of the panel 10 to reduce the weight of the panel 10 on the supporting flap assembly 22. With the weight reduced, the elastic element 38 pushes against the fan-wheel 26 to generate a gap between the fan-wheel 26 and the top flap 24. Thus, the boss 36 is no longer fixed in the selected recess 40, and the user can retract the fan-wheel 26 back into the supporting flap assembly 22.

Figure 4:
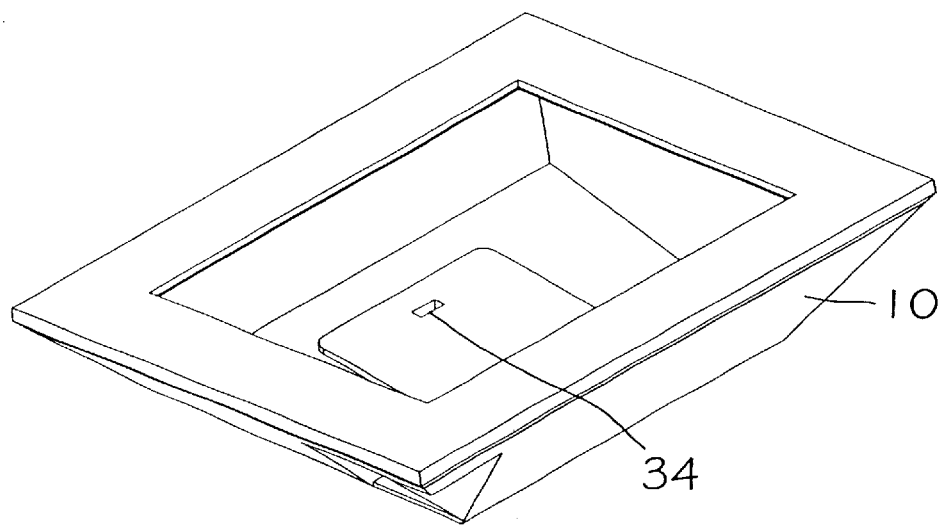
FIG. 4 illustrates a schematic diagram of an exploded view of a second embodiment of the present invention.
Figure 4:
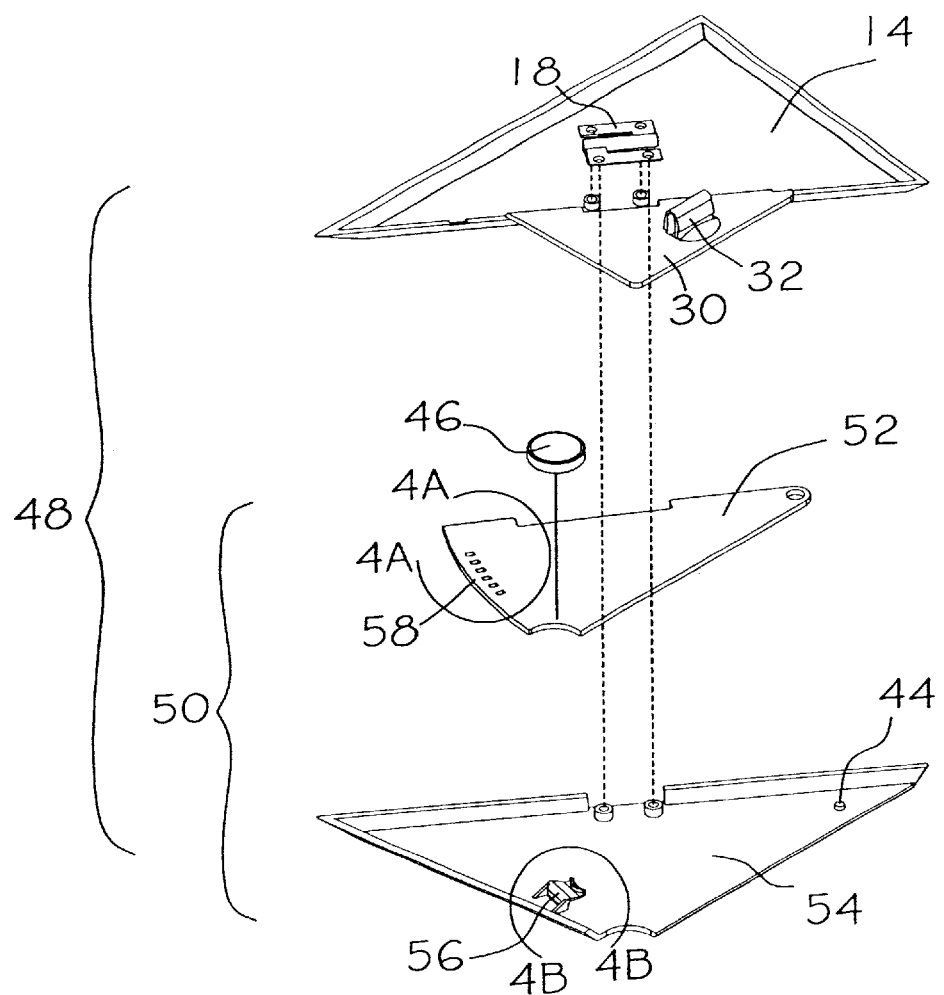
Figure 4A:
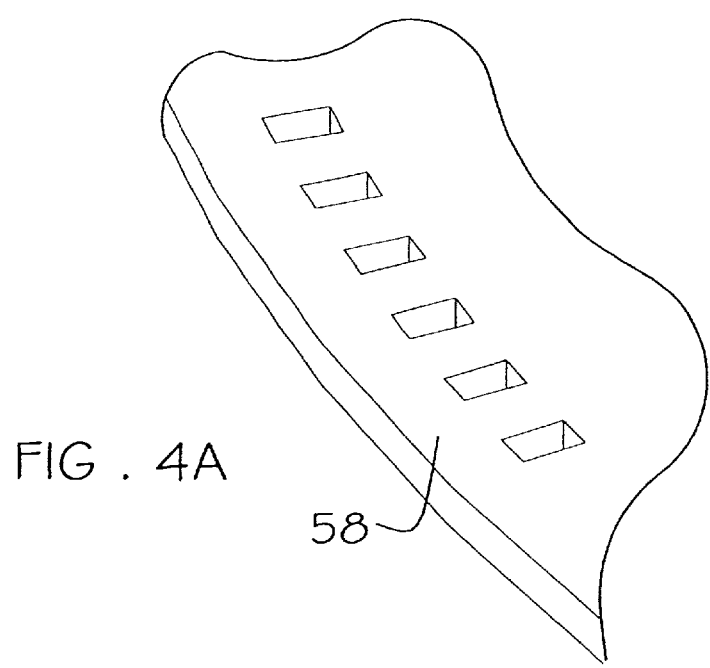
FIG. 4A illustrates an enlarged portion of the fan-wheel of FIG. 4 to show more detail of the recesses on the fan-wheel.
Figure 4B:
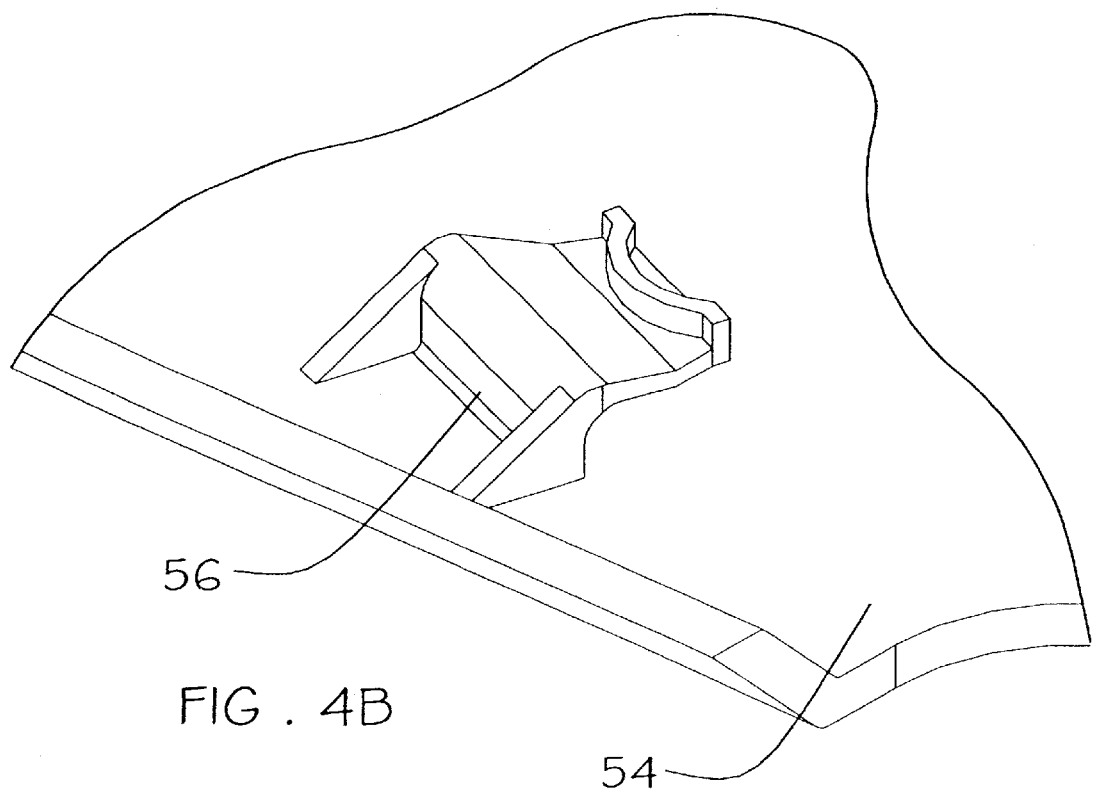
FIG. 4B illustrates an enlarged portion of the top flap of FIG. 4 to show more detail of the S-shaped hook.

FIG. 4 illustrates a schematic diagram of an exploded view of a second embodiment of the present invention. A base 48 in FIG. 4 is similar to the base 20 in FIG. 2. One difference is that a supporting flap assembly 50 only comprises a top flap 54 and a fan-wheel 52. Moreover, the top flap 54 has no elastic element. One surface of the top flap 54 includes a protrusion formed as an S-shaped hook 56 (see FIG. 4B). The S-shaped hook 56 is positioned to engage a plurality of recesses 58 (see FIG. 4A) on the facing surface of the fan-wheel 52. Since no elastic element is present, no arcuate groove is needed on the surface of the fan wheel 52 to accommodate the elastic element.

The operation of the fan-wheel 52 in FIG. 4 is different from the operation of the fan-wheel 26 in FIG. 3. When the user extracts the fan-wheel 52 from the supporting flap assembly 50 with the tab 46, the user can control the extent of the extraction of the fan-wheel 52 from the supporting flap assembly 50. The user can also adjust the elevation of the panel 10 by engaging the S-shaped hook 56 of the top flap 54 with the recesses 58 of the fan-wheel 52. When the panel 10 is set on a platform, the weight of the panel 10 makes the S-shaped hook 56 remain engaged with the recesses 58. Therefore, through the friction force between the tab 46 and the platform, the panel 10 can stand on the platform without sliding. When the fan-wheel 52 is to be retracted back into the supporting flap assembly 50, the user tugs the S-shaped hook 56 away from the recessions 58 with one hand. Concurrently, the user holds the tab 46 with another hand to retract the fan-wheel 52 back into the supporting flap assembly 50.

Figure 5:
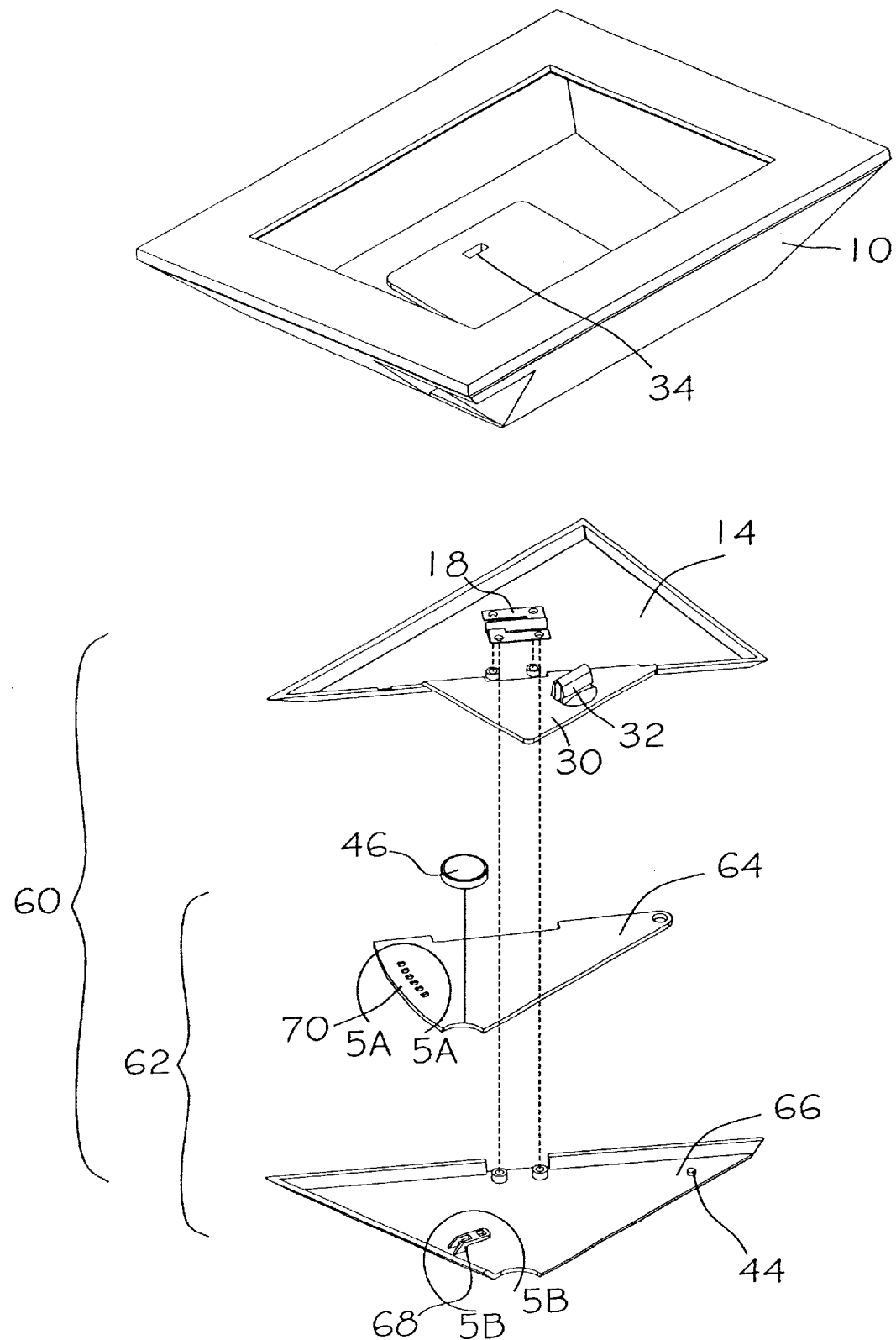
FIG. 5 illustrates a schematic diagram of an exploded view of a third embodiment of the present invention.
Figure 5A:
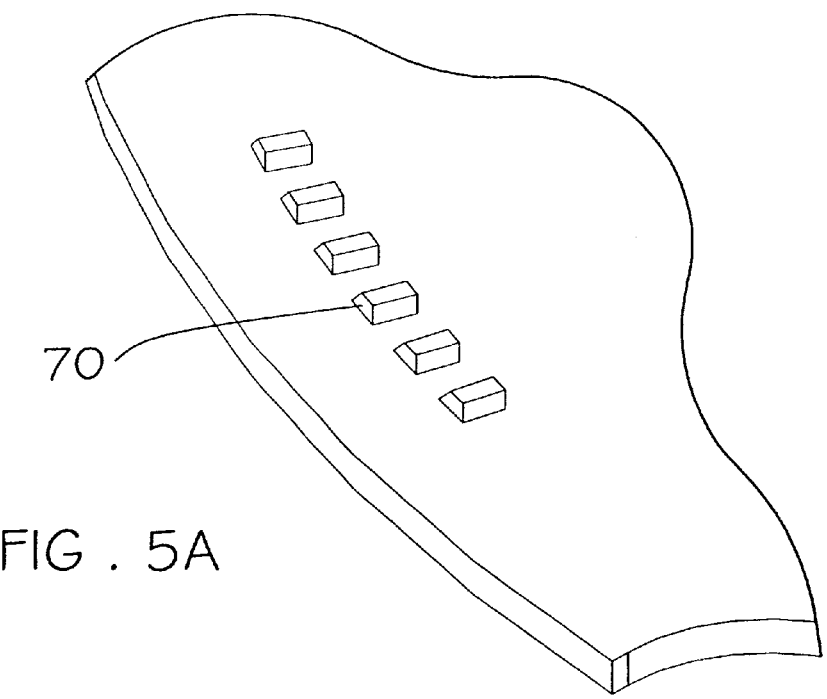
FIG. 5A illustrates an enlarged portion of the fan wheel of FIG. 5 to show more detail of the bosses on the fan-wheel.
Figure 5B:
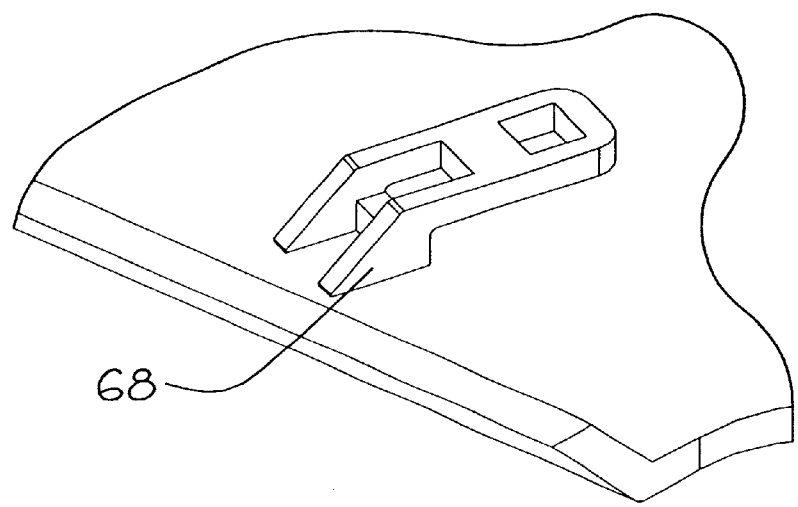
FIG. 5B illustrates an enlarged portion of the top flap of FIG. 5 to show more detail of the L-shaped hook.

FIG. 5 illustrates a schematic diagram of an exploded view of a third embodiment of the present invention. A base 60 in FIG. 5 is similar to the base 48 in FIG. 4. One difference is that the protrusion on one surface of the top flap 66 is an L-shaped hook 68 (see FIG. 5B) for engaging with a plurality of bosses 70 (see FIG. 5A) on one surface of a fan-wheel 64.

The operation of the fan-wheel 64 in FIG. 5 is similar to the operation of the fan-wheel 52 in FIG. 4. When the user extracts the fan-wheel 64 from a supporting flap assembly 62 with the tab 46, the user can control the extent of the extraction of the fan-wheel 64 from the supporting flap assembly 62. The user can also adjust the elevation of the panel 10 by engaging the L-shaped hook 68 of the top flap 66 with the bosses 70 of the fan-wheel 64. When the panel 10 is set on a platform, the weight of the panel 10 makes the L-shaped hook 68 remain engaged with the bosses 70. Therefore, through the friction force between the tab 46 and the platform, the panel 10 can stand on the platform without sliding. When the fan-wheel 64 is to be retracted back into the supporting flap assembly 62, the user tugs the L-shaped hook 68 away from the bosses 70 with one hand. Concurrently, the user holds the tab 46 with another hand to retract the fan-wheel 64 back into the supporting flap assembly 62.

Figure 6:
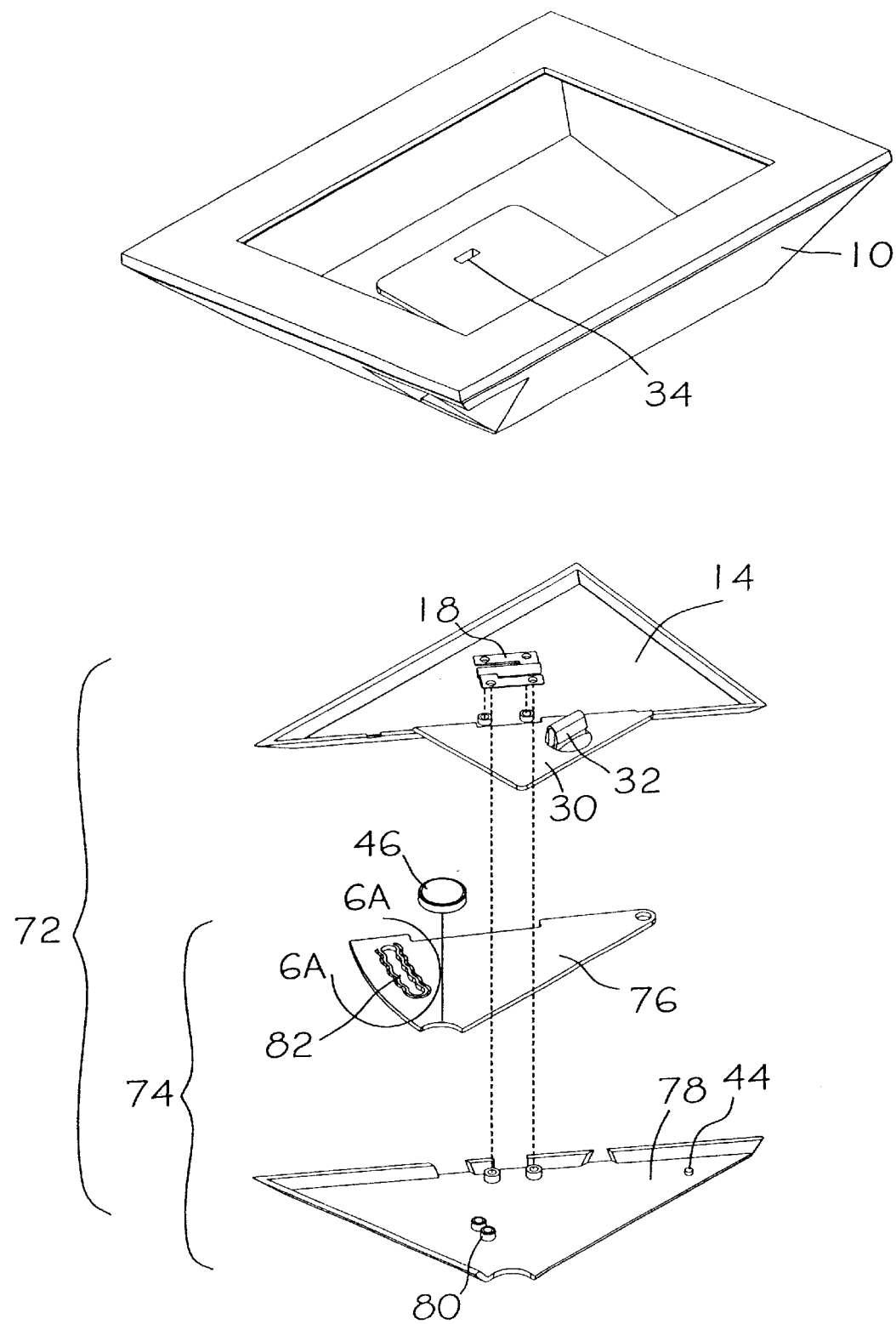
FIG. 6 illustrates a schematic diagram of an exploded view of a fourth embodiment of the present invention.
Figure 6A:
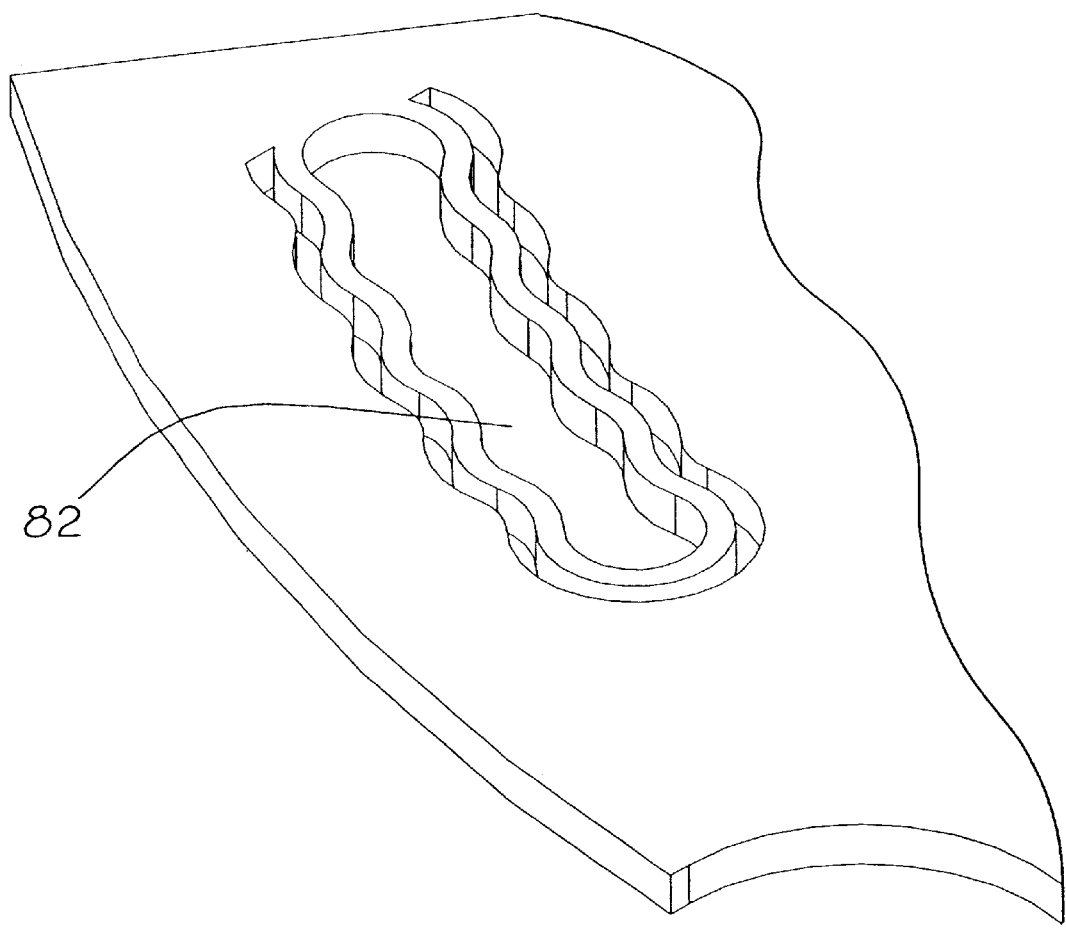
FIG. 6A illustrates an enlarged portion of the top flap of FIG. 6 to show more detail of the cavity formed in the top flap.

FIG. 6 illustrates a schematic diagram of an exploded view of a fourth embodiment of the present invention. When the user extracts a fan-wheel 76 from a supporting flap assembly 74 with the tab 46, the user can control the extent of the extraction of the fan-wheel 76 from the supporting flap assembly 74. The user can also adjust the elevation of the panel 10 by engaging two circular bosses 80 of a top flap 78 to a gourd-shaped cavity 82 (see FIG. 6A) of the fan-wheel 76. When the panel 10 is set on a platform, the two circular bosses 80 are engaged with the gourd-shaped cavity 82, and due to the friction force between the tab 46 and the platform, the panel 10 can stand on the platform without sliding. When the fan-wheel 76 is to be retracted back into the supporting flap assembly 74, the user pushes the two circular bosses 80 to deform the gourd-shaped cavity 82, and concurrently, the fan-wheel 76 can be retracted back into the supporting flap assembly 74.

Figure 7:
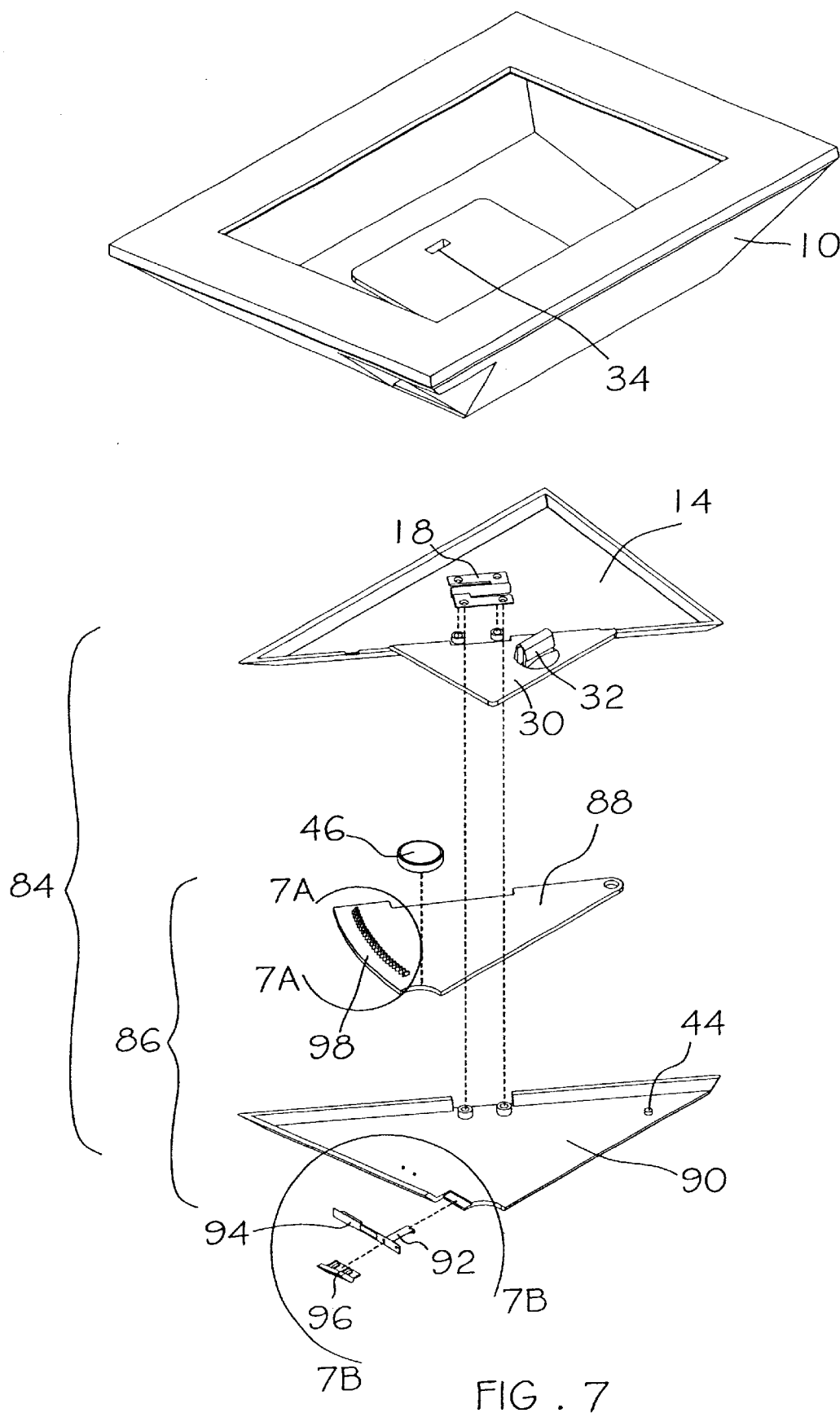
FIG. 7 illustrates a schematic diagram of an exploded view of a fifth embodiment of the present invention.
Figure 7A:
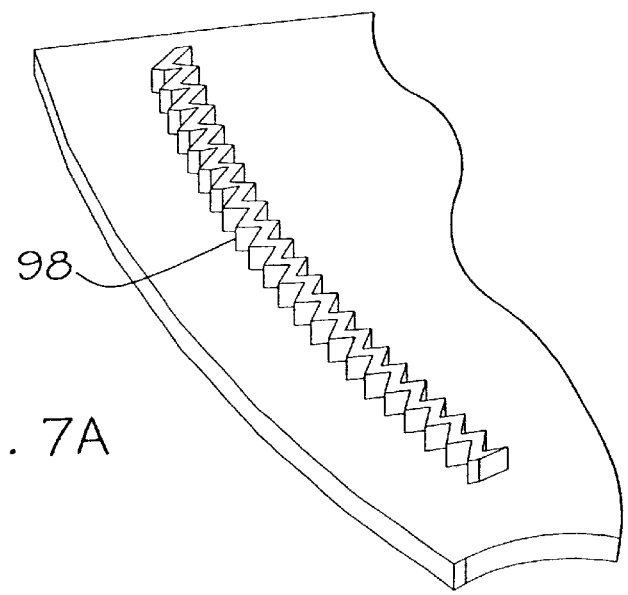
FIG. 7A illustrates an enlarged portion of the fan wheel of FIG. 7 to show more detail of the bosses on the fan-wheel.
Figure 7B:
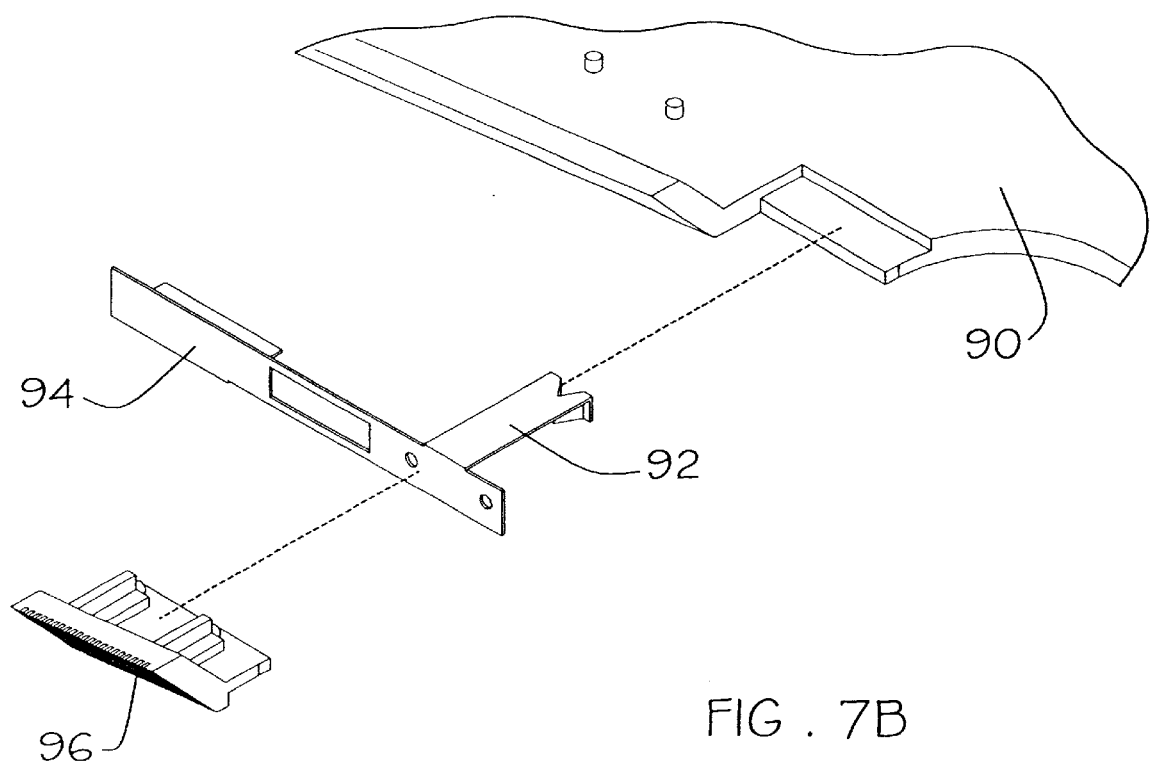
FIG. 7B illustrates an enlarged portion of the top flap of FIG. 7 to show more details of the spring slice, the engaging sheet, and the button.

FIG. 7 illustrates a schematic diagram of an exploded view of a fifth embodiment of the present invention. A base 84 in FIG. 7 is similar to the base 20 in FIG. 2. One difference is that an engaging sheet 92 connects with a spring slice 94 on one edge of a top flap 90 to form an L-shaped assembly (see FIG. 7B). The engaging sheet 92 is positioned to match with a plurality of bosses 98 (see FIG. 7A) on one surface of a fan-wheel 88. A button 96 is attached to the L-shaped assembly that comprises the engaging sheet 92 and the spring slice 94. The button 96 is used to push the spring slice 94 inward to detach the engaging sheet 92 from the bosses 98.

When the user extracts the fan-wheel 88 in FIG. 7 from a supporting flap assembly 86 with the tab 46, the user can control the extent of the extraction of the fan-wheel 88 from the supporting flap assembly 86. The user can also adjust the elevation of the panel 10 by selectively engaging the engaging sheet 92 of the top flap 90 with one of the bosses 98 of the fan-wheel 88. When the panel 10 is set on a platform, the weight of the panel 10 causes the engaging sheet 92 to securely engage the bosses 98. Therefore, through the friction force between the tab 46 and the platform, the panel 10 can stand on the platform without sliding. When the fan-wheel 88 is to be retracted back into the supporting flap assembly 86, the user pushes the button 96 to detach the engaging sheet 92 from the bosses 98 with one hand. Concurrently, the user holds the tab 46 with another hand to retract the fan-wheel 88 back into the supporting flap assembly 86.

As can be appreciated by those skilled in the art, the panel in the preferred embodiments can be any type of a panel including, for example, Internet station, Liquid Crystal Display (LCD) panel, Plasma Display Panel (PDP), Personal Digital Assistant (PDA), standing calculator, photo casing and picture casing.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A base that adjusts the elevation of a panel that has a backside, comprising:
   a fixed flap attached to the backside of the panel;
   a supporting flap assembly that supports the panel, the supporting flap assembly comprising a top flap and a fan-wheel, the top flap and fan-wheel having respective engagement mechanisms that are positioned proximate to each other; and
   a hinge that interconnects the fixed flap and the supporting flap assembly to permit the supporting flap assembly to be selectively positioned with respect to the fixed flap; and
   a pivot that couples the fan-wheel to the top flap to enable the fan-wheel to turn with respect to the top flap, the elevation of the base being adjustable by changing the extent to which the fan-wheel is turned with respect to the top flap, the respective engagement mechanisms of the top flap and the fan-wheel being selectively engageable with each other to maintain the fan-wheel in a position relative to the top flap.

2. A base that adjusts the elevation of a panel that has a backside, comprising:
   a fixed flap attached to the backside of the panel;
   a supporting flap assembly that supports the panel, the supporting flap assembly comprising a top flap and a fan-wheel, the top flap having a boss and an elastic element on a surface thereof, the fan-wheel having a plurality of recesses and an arcuate groove opposing to the surface of the top flap and forming on a surface of the fan-wheel, the recesses being positioned to match with the boss, and the arcuate groove being positioned to accommodate the elastic element; and
   a hinge comprising a shaft and connecting the fixed flap and the supporting flap assembly to permit the supporting flap assembly to turn around the shaft of the hinge and be selectively positioned with respect to the fixed flap; and
   a pivot that couples the fan-wheel to the top flap to enable the fan-wheel to turn with respect to the top flap, the elevation of the base being adjustable by changing the extent to which the fan-wheel is turned with respect to the top flap.

3. The base as defined in claim 2, further comprising a balk flap that extends from the fixed flap and that limits the extent to which the supporting flap assembly can be turned with respect to the fixed flap.

4. The base as defined in claim 3, further comprising a cavity on the backside of the panel and further comprising a wedged latch formed on the balk flap and positioned to match the cavity on the backside of the panel.

5. The base as defined in claim 2, wherein the supporting flap assembly further includes a bottom flap formed beneath the fan-wheel and positioned to cover the fan-wheel.

6. The base as defined in claim 2, wherein the fan-wheel further includes a tab that controls the turning of the fan-wheel and that provides a supporting point to prevent the panel from sliding.

7. The base as defined in claim 2, wherein the recesses connect with each other to form a bigger recess.

8. The base as defined in claim 2, wherein said panel includes Internet station, Liquid Crystal Display (LCD) panel, Plasma Display Panel (PDP), Personal Digital Assistant (PDA), standing calculator, photo casing and picture casing.

9. A base that adjusts the elevation of a panel that has a backside, comprising:
   a fixed flap attached to the backside of the panel;
   a supporting flap assembly that supports the panel, the supporting flap assembly comprising a top flap and a fan-wheel, the top flap having a protrusion on a surface thereof, the fan-wheel having a plurality of recesses formed on a surface thereof that faces the surface of the top flap that has the protrusion, the recesses being positioned to selectively engage the protrusion;
   a hinge comprising a shaft and connecting the fixed flap and the supporting flap assembly to enable the supporting flap assembly to turn around the shaft of the hinge and to be positioned with respect to the fixed flap; and
   a pivot that couples the fan-wheel to the top flap to enable the fan-wheel to turn with respect to the top flap, the elevation of the base being adjustable by changing the extent to which the fan-wheel is turned with respect to the top flap.

10. The base as defined in claim 9, further comprising a balk flap that extends from the fixed flap, the balk flap positioned to limit the extent to which the supporting flap assembly is turned with respect to the fixed flap.

11. The base as defined in claim 10, further comprising a cavity on the backside of the panel and further comprising a wedged latch formed on the balk flap and positioned to match the cavity on the backside of the panel.

12. The base as defined in claim 9, wherein the supporting flap assembly further includes a bottom flap formed beneath the fan-wheel and positioned to cover the fan-wheel.

13. The base as defined in claim 9, wherein the fan-wheel further includes a tab that controls the turning of the fan-wheel and that provides a supporting point to prevent the panel from sliding.

14. The base as defined in claim 9, wherein the recesses connect with each other to form a bigger recess.

15. The base as defined in claim 9, wherein said panel includes Internet station, Liquid Crystal Display (LCD)

panel, Plasma Display Panel (PDP), Personal Digital Assistant (PDA), standing calculator, photo casing and picture casing.

16. A base that adjusts the elevation of a panel that has a backside, comprising:

a fixed flap attached to the backside of the panel;

a supporting flap assembly that supports the panel, the supporting flap assembly comprising a top flap and a fan-wheel, the top flap having a spring slice and an engaging sheet, the spring slice positioned on one edge of the top flap, the engaging sheet extending from one side of the spring slice, the spring slice and the engaging sheet forming a generally L-shaped assembly, the fan-wheel having a plurality of bosses formed on a surface thereof and positioned to selectively engage the engaging sheet;

a hinge comprising a shaft and connecting the fixed flap and the supporting flap assembly to enable the supporting flap assembly to turn around the shaft of the hinge and be selectively positioned with respect to the fixed flap; and a pivot that couples the fan-wheel to the top flap to enable the fan-wheel to turn with respective to the top flap, the elevation of the base being adjustable by changing the extent to which the fan-wheel is turned with respect to the top flap.

17. The base as defined in claim 16, further comprising a button coupled to the spring slice to enable the spring slice to be selectively moved into engagement with at least one of the plurality of bosses.

18. The base as defined in claim 16, further comprising a balk flap that extends from the fixed flap, the balk flap positioned to limit the extend to which the supporting flap assembly is turned with respect to the fixed flap.

19. The base as defined in claim 16, wherein the fan-wheel further includes a tab that controls the turning of the fan-wheel and that provides a supporting point to prevent the panel from sliding.

20. The base as defined in claim 16, wherein the panel includes Internet station, Liquid Crystal Display (LCD) panel, Plasma Display Panel (PDP), Personal Digital Assistant (PDA), standing calculator, photo casing and picture casing.

* * * * *